US011057863B2

United States Patent
Moriwaki et al.

(10) Patent No.: US 11,057,863 B2
(45) Date of Patent: Jul. 6, 2021

(54) TERMINAL DEVICE AND NETWORK DEVICE FOR EXCHANGING INFORMATION ON SELECTED BEAM

(71) Applicant: KDDI CORPORATION, Tokyo (JP)

(72) Inventors: Kazuya Moriwaki, Fujimino (JP); Hailan Peng, Fujimino (JP); Noriyuki Hashimoto, Fujimino (JP); Yasuhiro Suegara, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 16/295,344

(22) Filed: Mar. 7, 2019

(65) Prior Publication Data

US 2019/0208498 A1 Jul. 4, 2019

Related U.S. Application Data

(63) Continuation of application No. PCT/JP2017/022808, filed on Jun. 21, 2017.

(30) Foreign Application Priority Data

Sep. 28, 2016 (JP) .............................. JP2016-189443

(51) Int. Cl.
*H04W 68/00* (2009.01)
*H04W 76/27* (2018.01)
(Continued)

(52) U.S. Cl.
CPC ......... *H04W 68/005* (2013.01); *H04W 24/08* (2013.01); *H04W 68/02* (2013.01);
(Continued)

(58) Field of Classification Search
CPC . H04J 11/0069; H04W 72/046; H04W 68/02; H04W 76/27; H04W 48/18; H04W 48/20; H04W 16/28
See application file for complete search history.

(56) References Cited

U.S. PATENT DOCUMENTS 8,897,254 B2 11/2014 Koivisto et al.
9,888,419 B2 2/2018 Choi et al.
(Continued)

FOREIGN PATENT DOCUMENTS

CN 103004160 A 3/2013
CN 105812035 A 7/2016
(Continued)

OTHER PUBLICATIONS

Islam et al (U.S. Appl. No. 62/322,68), filed Apr. 13, 2016. (Year: 2016).*

(Continued)

*Primary Examiner* — Ian N Moore
*Assistant Examiner* — Sun Jong Kim
(74) *Attorney, Agent, or Firm* — Thomas | Horstemeyer, LLP (57) ABSTRACT

A terminal device that can be connected to one or more base station devices that each form one or more beams is described. The terminal device monitors, when the terminal device is not connected to any of the one or more base station devices, a connection target beam to be used when the terminal device establishes a connection with any of the one or more base station devices; and reports, at least based on a fact that the connection target beam has transitioned, information regarding the connection target beam to a base station device that forms the connection target beam. A base station device among the one or more base station devices to execute paging of the terminal device and a beam to be used in the paging are controlled based on the information regarding the connection target beam.

11 Claims, 5 Drawing Sheets

(51) Int. Cl.
  *H04W 88/02* (2009.01)
  *H04W 24/08* (2009.01)
  *H04W 68/02* (2009.01)
  *H04W 72/04* (2009.01)
  *H04W 16/28* (2009.01)
(52) U.S. Cl.
  CPC ......... *H04W 76/27* (2018.02); *H04W 88/023* (2013.01); *H04W 16/28* (2013.01); *H04W 72/046* (2013.01)

(56) References Cited

U.S. PATENT DOCUMENTS

| | | | |
|---|---|---|---|
| 10,194,402 | B2 | 1/2019 | Balachandran et al. |
| 10,536,885 | B2 | 1/2020 | Cedergren et al. |
| 2010/0173633 | A1 | 7/2010 | Catovic et al. |
| 2011/0080825 | A1 | 4/2011 | Dimou et al. |
| 2011/0286321 | A1 | 11/2011 | Suresfichandran et al. |
| 2013/0064129 | A1 | 3/2013 | Koivisto et al. |
| 2015/0271763 | A1 | 9/2015 | Balachandran et al. |
| 2016/0150435 | A1 | 5/2016 | Baek et al. |
| 2017/0054486 | A1* | 2/2017 | Reial ................. H04L 5/0048 |
| 2017/0332300 | A1 | 11/2017 | Choi et al. |
| 2018/0138962 | A1* | 5/2018 | Islam ................. H04L 5/0048 |
| 2018/0152869 | A1 | 5/2018 | Cedergren et al. |
| 2019/0200397 | A1 | 6/2019 | Jia et al. |
| 2019/0319686 | A1* | 10/2019 | Chen, IV ............ H04W 72/046 |
| 2020/0120565 | A1 | 4/2020 | Cedergren et al. |

FOREIGN PATENT DOCUMENTS

| | | |
|---|---|---|
| CN | 105959966 A | 9/2016 |
| JP | 2007-019982 A | 1/2007 |
| JP | 2008-104167 A | 5/2008 |
| JP | 2012-514948 A | 6/2012 |
| JP | 2013-098950 A | 5/2013 |
| JP | 2013-526821 A | 6/2013 |
| WO | 2011150549 A1 | 12/2011 |
| WO | 2011150559 A1 | 12/2011 |
| WO | 2014115734 A1 | 7/2014 |
| WO | 2016107254 A1 | 7/2016 |
| WO | 2016147602 A1 | 9/2016 |
| WO | 2016198123 A1 | 12/2016 |
| WO | 2018039932 A1 | 3/2018 |
| WO | 2018061347 A1 | 4/2018 |
| WO | 2018061348 A1 | 4/2018 |
| WO | 2018061349 A1 | 4/2018 |

OTHER PUBLICATIONS

Chen etal (U.S. Appl. No. 62/364,478), filed Jul. 20, 2016. (Year: 2016).*
Japanese Office Action for Japanese Patent Application No. 2016-189443 dated Nov. 1, 2019.
Japanese Office Action for Japanese Patent Application No. 2016-189442 dated Nov. 15, 2019.
Mediatek Inc: 'Cell' Concept in NR, 3GPP TSG-RAN WG2#95, R2-164897, Aug. 22-26, 2016, Gothenburg, Sweden, Retrieved from the Internet: URL:http://www.3gpp.org/ftp/tsg_ran/WG2_RL2/TSGR2_95/Docs/R2-164897.zip, (Retrieved on Oct. 24, 2019).
LG Electronics Inc: RAN controlled state in Standalone NR, 3GPP TSG-RAN WG2#95, R2-165697, Aug. 22-26, 2016, Gothenburg, Sweden, Retrieved from the Internet: URL: http://www.3gpp.org/ftp/tsg_ran/WG2_RL2/TSGR2_95/Docs/R2-165697.zip, (Retrieved on Oct. 24, 2019).
Extended European Search Report for European Patent Application No. 17855306.1 dated Jul. 17, 2019.
International Search Report for PCT/JP2017/022808 dated Sep. 5, 2017 (partially translated).
NTT Docomo, Inc., Summary of email discussion [93bis#23][NR] Deployment scenarios, R2-164306, 3GPP TSG-RAN WG2 #94, May 23-27, 2016, Nanjing, China.
NTT Docomo, Inc., New SID Proposal: Study on New Radio Access Technology, RP-160671, 3GPP TSG-RAN Meeting #71, Mar. 7-10, 2016, Göteborg, Sweden.
3GPP, TS 36.331 V12.9.0 (Release 12), Mar. 2016,Valbonne, France.
Mediatek Inc., Mobility Supporting for HF-NR, R2-163484, 3GPP TSG-RAN WG2 #94, May 23-27, 2016, Nanjing, China.
3GPP, RLM and RLF in HF NR, R2-164899, 3GPP TSG RAN WG2 Meeting #95, Aug. 22-26, 2016, Gothenburg, Sweden.
Huawei, Hisilicon, General Aspects for NR HF Cell, R2-165585, 3GPP TSG-RAN2 Meeting #95, Aug. 22-26, 2016, Gothenburg, Sweden.
Huawei, Hisilicon, RLF for NR, R2-167003, 3GPP TSG-RAN WG2 Meeting #95, Oct. 10-14, 2016, Kaohsiung, Taiwan.
Catt, Intra-RAT mobility in NR, R2-163473, 3GPP TSG RAN WG2 Meeting #94, May 23-27, 2016, Nanjing, China.
International Search Report for PCT/JP2017/022820 dated Jul. 25, 2017 (partially translated).
International Search Report for PCT/JP2017/022778 dated Aug. 29, 2017 (partially translated).
Extended European Search Report for European Patent Application No. 17855308.7 dated Aug. 29, 2019.
3GPP, 3rd Generation Partnership Project; Technical Specification Group Radio Access Network; Study on New Radio Access Technology; Radio Access Architecture and Interfaces (Release 14), R3-160947, 3GPP TR 38.801 V0.1.0, XP051094946, Sophia-Antipolis Cedex, France, Retrieved from the Internet: URL:http://www.3gpp.org/ftp/tsg_ran/WG3_lu/TSGR3_91bis/Docs/, (Retrieved on Apr. 28, 2016).
CMCC, Discussion on intra-NR mobility, R2-165216 Discussion of Mobility in Intra Nr, 3rd Generation Partnership Project (3GPP), vol. RAN WG2, no. Goeteborg; Aug. 22, 2016-Aug. 26, 2016, XP051126813, Sophia-Antipolis Cedex, France, Retrieved from the Internet: URL:http://www.3gpp.org/ftp/Meetings_3GPP_SYNC/RAN2/Docs/, (Retrieved on Aug. 21, 2016).
ZTE: Initial mobility consideration for the NextGen, R3-160799 3rd Generation Partnership Project (3GPP), Sophia-Antipolis Cedex; France, vol. TSG-RAN WG3, no. Bangalore, India; Apr. 11, 2016-Apr. 15, 2016, XP051082948, Retrieved from the Internet: URL:http://www.3gpp.org/ftp/tsg_ran/WG3_lu/TSGR3_91bis/Docs/, (Retrieved on Apr. 1, 2016).
U.S. Office Action for U.S. Appl. No. 16/295,333 dated Apr. 24, 2020.
Office Action for Chinese Application No. 201780055139.8 dated Sep. 1, 2020.

* cited by examiner

TERMINAL DEVICE AND NETWORK DEVICE FOR EXCHANGING INFORMATION ON SELECTED BEAM

This application is a continuation of International Patent Application No. PCT/JP2017/022808 filed on Jun. 21, 2017, and claims priority to Japanese Patent Application No. 2016-189443 filed on Sep. 28, 2016, the entire content of both of which are incorporated herein by reference.

BACKGROUND OF THE INVENTION

Field of the Invention

The present invention relates to a terminal device, a network device, a control method, and a computer readable storage medium, and specifically relates to a paging technique in radio communication.

Description of the Related Art

A novel radio access technique of the fifth generation (hereinafter referred to as "5G") has been considered in the Third Generation Partnership Project (see 3GPP contribution, RP-160671, March 2016 and 3GPP, TS36.331). In a 5G system, it is assumed that a base station device that is also called NR gNB includes a plurality of devices that are called a central unit (CU) and a distributed unit (DU). Note that the DU is also called a transmission receiver point (TRP). It is assumed that the DU performs processing in layers that are lower than at least a radio resource control (RRC) layer and that include at least a physical (PHY) layer, and the CU performs processing in layers that are higher than the layers controlled by the DU and that include the RRC layer. Further, it is assumed that a plurality of DUs are connected to a single CU. Each DU forms one or more beams through, for example, beamforming, and establishes a connection with a terminal device by using at least one of the beams. That is, the base station device includes at least one CU and a plurality of DUs that are connected to the CU, and as a result of each DU forming one or more beams, the base station device forms a large number of beams and is connected to a terminal device by using at least one of the beams.

In a conventional Long Term Evolution (LTE) system, when a terminal device is called, a paging message is simultaneously sent from a core network to all base station devices to which the same tracking area code (TAC) is assigned. Then, each base station device that receives the paging message sends the paging message using a radio signal in cells that are provided by the respective base station devices to call the terminal device that is located in any of the cells. When such a paging method is applied as is to the 5G system, the paging message is sent by using a large number of beams, and therefore a radio resource such as a spatial resource may be wasted or the paging message may interfere with another signal.

SUMMARY OF THE INVENTION

The present invention provides a technique that calls a terminal device with high radio resource utilization efficiency and little interference.

A terminal device according to an aspect of the present invention is a terminal device that can be connected to one or more base station devices that each form one or more beams, the terminal device including: monitoring unit for monitoring, in an unconnected state in which the terminal device is not connected to any of the one or more base station devices, a connection target beam to be used when the terminal device establishes a connection with any of the one or more base station devices; and reporting unit for reporting, at least based on a fact that the connection target beam has transitioned, information regarding the connection target beam to a base station device that forms the connection target beam, wherein which base station device among the one or more base station devices is to execute paging of the terminal device and which beam is to be used in the paging are controlled based on the information regarding the connection target beam.

A network device according to an aspect of the present invention is a network device in a network that includes one or more base station devices that each form one or more beams, the network device including: receiving unit for receiving, from a terminal device that can be connected to the one or more base station devices, a report regarding a connection target beam to be used when the terminal device establishes a connection with any of the one or more base station devices in an unconnected state; and control unit for performing control such that paging of the terminal device is performed by using some beams that include the connection target beam from among a plurality of beams that are formed by the one or more base station devices.

According to the present invention, it is possible to call a terminal device with high radio resource utilization efficiency and little interference.

Other features and advantages of the present invention will be apparent from the following description taken in conjunction with the accompanying drawings. Note that the same reference numerals denote the same or like components throughout the accompanying drawings.

BRIEF DESCRIPTION OF THE DRAWINGS

The accompanying drawings are included in the description, constitute a part of the description, illustrate embodiments of the present invention, and are used for explaining the principle of the present invention in conjunction with the description of the embodiments.

DESCRIPTION OF EMBODIMENTS

The following describes an embodiment of the present invention with reference to the drawings.

(Configuration of Radio Communication System)

Figure 1:
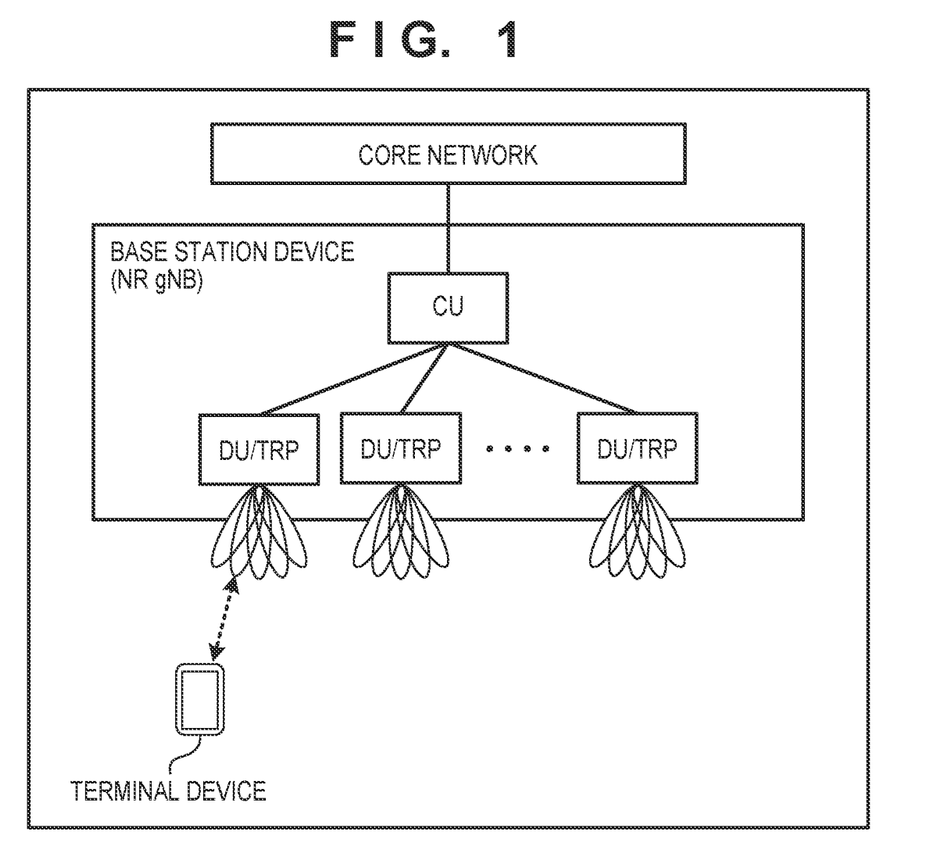
FIG. 1 is a diagram illustrating an example of a configuration of a radio communication system.

FIG. 1 illustrates an example of a configuration of a radio communication system according to the present embodiment. The radio communication system according to the present embodiment is, for example, a mobile radio communication system of the fifth generation (5G) and includes a base station device (NR gNB) and a terminal device. A radio connection is established between the base station device and the terminal device and a radio signal is transmitted therebetween. The base station device is connected to a core network by, for example, a wire (in some cases, a line that includes a radio section) and is connected to other base station devices (not illustrated) via the core network. Note that the core network is connected to an external network such as the Internet via, for example, a gateway, and the base station device can be connected to the external network via the core network. Note that the core network includes various nodes of the core network.

The base station device of the present embodiment includes, as internal units, a first unit (first control device) that controls lower layers in communication and a unit (second control device) that controls upper layers. In FIG. 1, the first control device is denoted with DU (distributed unit)/TRP (transmission receiver point) and the second control device is denoted with CU (central unit). In the following description, the first control device is referred to as a DU and the second control device is referred to as a CU. The DU of the present embodiment is configured to control at least the physical (PHY) layer and not to control at least the radio resource control (RRC) layer and layers higher than the RRC layer. On the other hand, the CU is configured to control layers that are higher than the DU and that include the RRC layer. Although a single DU may be connected to the CU, a plurality of DUs can be connected to the CU as illustrated in FIG. 1. Note that a line that connects the CU and the DU is called a fronthaul line. The CU and the DU may be directly connected as illustrated in FIG. 1, or a switch (not illustrated) that is connected to a plurality of DUs may be connected to the CU and communication between the CU and each DU may be performed based on control of the switch. When a switch is used, communication between DUs can be performed without involving the CU. In the following description, the DU and the CU (base station device), and devices in the core network are each referred to as a network device.

The DU is capable of forming a plurality of beams through beamforming. As a result of a large number of DUs forming a plurality of beams as illustrated in FIG. 1, the number of beams that can be formed by the base station device increases, and therefore a large number of users can be accommodated and a total throughput can be increased. As the number of users who are accommodated increases, the number of times a paging message is transmitted increases. In this situation, for example, when the same paging message is transmitted by all DUs of a plurality of base station devices to which the same tracking area code (TAC) is assigned, a radio resource is occupied by the transmission of the paging message while the paging message is transmitted. Furthermore, in such a case, it is highly likely that the paging message will interfere with communication between base station devices of the same TAC or between base station devices of different TACs.

In contrast, according to the present embodiment, when the terminal device is in an unconnected state in which the terminal device is not connected to any of the base station devices, the terminal device monitors a beam that is to be used when establishing a connection with any of the base station devices. In the following description, a beam that is to be used when establishing a connection with a base station device is called a connection target beam. The terminal device reports information regarding the connection target beam to a base station device that forms the connection target beam at least based on the fact that the connection target beam transitioned as a result of movement of the terminal device, for example. Based on this information, the network device (DU/CU or a node in the core network) performs control to limit beams that are to be used for sending the paging message.

Note that the terminal device is capable of reporting the information regarding the connection target beam while the terminal device is in the unconnected state. Note that, although an RRC_Connected state and an RRC_Idle state are defined in the LTE, it is possible to define a state, for example, between these states, in which an RRC connection is not established but a predetermined signal can be transmitted. The unconnected state referred to herein includes such a state in which the RRC connection is not established but a predetermined signal can be transmitted.

The terminal device can report the information regarding the connection target beam also based on the number of transitions of the connection target beam in the unconnected state. For example, every time the connection target beam has transitioned a predetermined number of times, for example, three times, the terminal device may report the state of the connection target beam at that point in time. Note that the terminal device can report the connection target beam every time the number of transitions of the connection target beam reaches the predetermined number of times while the unconnected state is continuing. That is, for example, while the unconnected state is continuing, the terminal device can report the connection target beam when the connection target beam transitions the predetermined number of times from the last time the terminal device reported the connection target beam. Note that, once the terminal device enters a connected state, the network device can track a beam that is used by the terminal device for the connection. Therefore, the terminal device can reset the number of transitions to zero upon entering the connected state.

The terminal device can report the information regarding the connection target beam also based on the number of beams to which the connection target beam transitioned in the unconnected state. For example, when the connection target beam alternately transitions between two beams, the terminal device counts the number of beams to which the connection target beam transitioned as "two" irrespective of the number of transitions. When the number of beams to which the connection target beam has transitioned reaches a predetermined number, for example, "three", the terminal device reports the connection target beam. Note that the terminal device can report the connection target beam every time the number of beams to which the connection target beam transitioned reaches the predetermined number while the unconnected state is continuing. That is, for example, while the unconnected state is continuing, the terminal device can report the connection target beam when the connection target beam has transitioned to the predetermined number of beams from the last time the terminal device reported the connection target beam. Note that the terminal device can reset the number of beams to zero upon entering the connected state. Note that the terminal device may use a combination of the number of transitions of the connection target beam and the number of beams to which the connection target beam transitioned. For example, the terminal device may report the connection target beam when the number of transitions of the connection target beam reaches the predetermined number of times or when the number of beams to which the connection target beam transitioned reaches the predetermined number.

When the connection target beam transitions in the unconnected state, the terminal device may report the connection target beam when a DU that provides a post-transition connection target beam differs from a DU that provides a pre-transition connection target beam. Note that when there is no change of the DU that provides the connection target beam, the terminal device can report the connection target beam based on, for example, the number of transitions of the connection target beam and the number of beams to which the connection target beam transitioned, as described above.

Note that the condition under which the terminal device reports the connection target beam can be specified by the base station device. Upon receiving the condition from the base station device, the terminal device can report the connection target beam in accordance with the condition. Note that "receiving from the base station device" described herein includes receiving from a node of the core network via the base station device.

The network device (the base station device (DU/CU) or the node of the core network) receives the above-described report of the connection target beam from the terminal device. The network device then performs control such that paging of the terminal device is performed by using some beams that include the reported connection target beam from among a plurality of beams that are formed by one or more base station devices. For example, when the terminal device makes the above report every time the connection target beam transitions, the network device can perform control such that paging is performed by using only the reported connection target beam. When the terminal device makes the above report every time the connection target beam transitions three times, the network device can perform control such that paging is performed by using the connection target beam, a first beam that is adjacent to the connection target beam, and a second beam that is adjacent to the first beam. Also, when the terminal device makes the above report every time the number of beams to which the connection target beam has transitioned reaches three, the network device can perform control such that paging is performed by using the connection target beam and the above-described first and second beams. When the terminal device makes the above report every time the DU that provides the connection target beam differs between before and after a transition of the connection target beam, the network device can perform control such that paging is performed by using beams that are provided by the DU that provides the post-transition connection target beam.

Note that when the network device that performs the above-described control is, for example, a node of the core network, the paging message is sent only to a DU that forms a beam to be used for paging. Accordingly, the paging message is not sent to a second CU that is different from a first CU to which the DU is connected, and to other DUs under the first CU. Therefore, it is possible to reduce the load on a backhaul line and the fronthaul line, and also on CUs and DUs that do not perform paging.

When the network device that performs the above control is, for example, a CU, the node of the core network sends the paging message to base station devices (CUs) that have the same TAC, for example. When the received paging message is to be sent by using a beam that is formed by a DU under the CU, the CU can send the paging message to the DU. Therefore, the fronthaul line can be kept from being unnecessarily used. Also, the paging message is not sent to DUs that do not perform paging, and therefore the load on many DUs can be reduced. Further, the node of the core network need not manage information regarding the beam by which the paging message is to be sent, and the destination of the paging message, and therefore the processing load can be reduced.

When the network device that performs the above control is, for example, a DU, the node of the core network can send the paging message to base station devices (CUs) that have the same TAC, for example, and the CUs can transfer the paging message to all DUs under the CUs. When the paging message is to be sent by using a beam that is formed by the DU, the DU sends the paging message as a radio signal. According to this configuration, the node of the core network and the CUs need not manage information regarding the beam by which the paging message is to be sent, and the destination of the paging message, and therefore the processing load can be reduced.

As described above, the terminal device in the unconnected state notifies the network of the information regarding the connection target beam, which is information that indicates a beam to be used when establishing a connection, and the network device performs paging using only some beams based on the information. As a result, wasting of the radio resources can be prevented and interference with communication that is performed by using another beam can be reduced.

The following describes configurations of the terminal device and the network device that perform processing as described above and the flow of the processing.

(Hardware Configuration)

Figure 2:
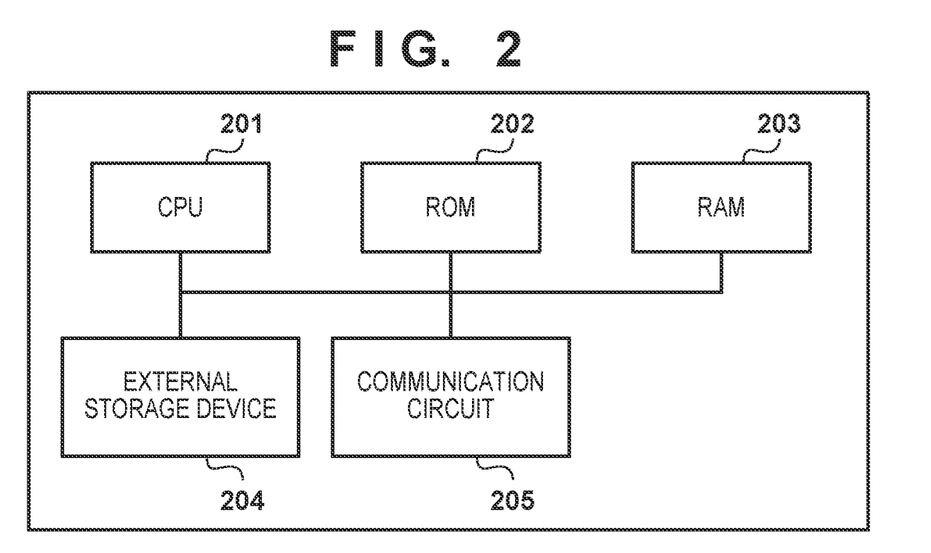
FIG. 2 is a diagram illustrating an example of hardware configurations of a terminal device and a network device.

FIG. 2 illustrates an example of hardware configurations of the terminal device and the network device. In an example, the terminal device and the network device have the hardware configuration as illustrated in FIG. 2, and includes, for example, a CPU 201, a ROM 202, a RAM 203, an external storage device 204, and a communication circuit 205. In the terminal device and the network device, the CPU 201 executes programs that realize functions of the terminal device and the network device as described above, the programs being stored in, for example, any of the ROM 202, the RAM 203, and the external storage device 204.

The terminal device and the network device communicate with another device through the communication circuit 205 that is controlled by the CPU 201, for example. Note that the communication circuit 205 of the network device can communicate with another network device via a wire circuit, for example. In the case where the network device is the DU, the communication circuit 205 can also perform radio communication with the terminal device by forming one or more (a plurality of) beams. The communication circuit 205 of the terminal device is configured such that it can connect with at least one of the beams that are formed by the communication circuit 205 of the DU, and can perform radio communication with the DU by using the beam. Although the configuration of the terminal device and the network device schematically illustrated in FIG. 2 includes a single communication circuit 205, this configuration should not be taken as a limitation, and each of the terminal device and the network device may include a plurality of communication circuits. For example, the DU includes a first communication circuit for communication via the fronthaul line and a second communication circuit for radio communication. The CU can include a first communication circuit for communication via the fronthaul line and a second communication circuit for communication with the core network. The terminal device may include, for example, a first communication circuit in accordance with radio communication standards of the fourth or earlier generation and a second communication circuit in accordance with radio communication standards of the fifth generation. The terminal device may include, for example, a radio communication circuit in accordance with standards of a network such as a wireless LAN other than a cellular network, and may further include, for example, a wired communication circuit that is used for a wired connection such as a USB connection.

Note that the terminal device and the network device may include dedicated hardware that performs respective functions, or some functions may be performed by hardware and other functions may be performed by a computer that executes programs. Alternatively, all functions may be performed by the computer and programs.

(Functional Configuration)

Figure 3:
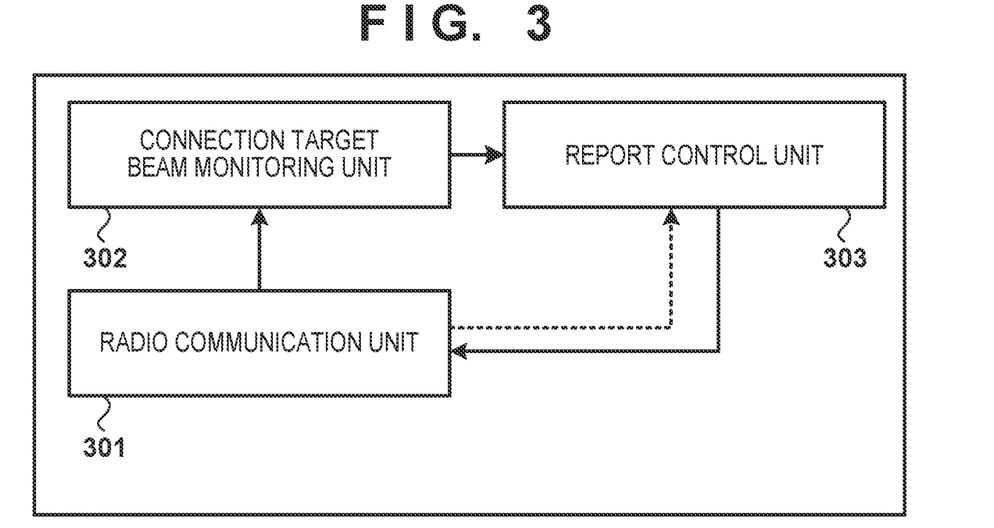
FIG. 3 is a diagram illustrating an example of a functional configuration of the terminal device.

First, an example of a functional configuration of the terminal device will be described with reference to FIG. 3. In an example, the terminal device includes a radio communication unit 301, a connection target beam monitoring unit 302, and a report control unit 303. Note that, although the terminal device can include various other functional units of a general communication terminal or a general electronic equipment that has a communication function, those functions are not illustrated in the drawings for simplification of the description.

The radio communication unit 301 is configured such that it can connect with at least one of a plurality of beams that are formed by one or more DUs in one or more base station devices by controlling a non-illustrated antenna. The radio communication unit 301 is capable of generating a baseband signal from, for example, to-be-transmitted data or information that is generated by the report control unit 303, converting the baseband signal to a signal of a radio frequency, and outputting the signal as a radio signal from the antenna. Also, the radio communication unit 301 is capable of converting a radio signal that is received by the antenna to a baseband signal, and obtaining information from the baseband signal.

In the unconnected state in which no connection is established with any of the base station devices, the connection target beam monitoring unit 302 monitors which beam among beams formed by any of the base station devices is the connection target beam that is to be used when establishing a connection. Note that the connection referred to herein is, for example, an RRC connection, and the unconnected state is a state other than the RRC_Connected state. For example, the connection target beam monitoring unit 302 observes radio quality based on predetermined signals (for example, reference signals) that are transmitted by the respective beams, and determines a beam with the highest radio quality or a beam with radio quality of at least a predetermined level as the connection target beam. Note that the connection target beam monitoring unit 302 is not required to necessarily determine a single beam as the connection target beam, and may identify a plurality of connection target beams or determine that there is no connection target beam, depending on the circumstances.

The report control unit 303 performs control for reporting information regarding the connection target beam, which is obtained as a result of monitoring by the connection target beam monitoring unit 302, to the base station device (network device). The report control unit 303 can control the radio communication unit 301 to notify the base station device of the information regarding the connection target beam under a condition that, for example, the connection target beam transitioned in the unconnected state. Alternatively, the report control unit 303 can control the radio communication unit 301 to notify the base station device of the information regarding the connection target beam under a condition that, for example, the number of transitions of the connection target beam reached a predetermined number of times in the unconnected state. Alternatively, the report control unit 303 can control the radio communication unit 301 to notify the base station device of the information regarding the connection target beam under a condition that, for example, the number of beams to which the connection target beam transitioned reached a predetermined number in the unconnected state. Alternatively, the report control unit 303 can control the radio communication unit 301 to notify the base station device of the information regarding the connection target beam under a condition that, for example, upon a transition of the connection target beam in the unconnected state, the DU that provides the post-transition connection target beam differs the DU that provides the pre-transition connection target beam. Alternatively, the report control unit 303 may report the information regarding the connection target beam when a predetermined period elapsed, while the unconnected state is continuing, after information regarding the connection target beam was reported last time. Note that the above conditions are merely examples, and the report control unit 303 may control the radio communication unit 301 to report the information regarding the connection target beam when a combination of any of the conditions is satisfied, or under any other condition. Note that the report control unit 303 may receive a condition for reporting the information regarding the connection target beam from the network device via the radio communication unit 301.

Note that, although the report of the information regarding the connection target beam can be sent, for example, when the RRC connection is established, the report may be sent when the RRC connection is not established (i.e., in the unconnected state). For example, a state in which the RRC connection is not established but a predetermined signal can be transmitted may be defined as an intermediate state between the RRC_Connected state and the RRC_idle state, and the information regarding the connection target beam may be reported in the intermediate state.

Note that when, for example, the base station device to which the DU that provides the post-transition connection target beam belongs has a TAC that is different from a TAC of the base station device to which the DU that provides the pre-transition connection target beam belongs, the report control unit 303 can cause the information regarding the connection target beam to be sent to the DU that provides the post-transition connection target beam by establishing an RRC connection.

Figure 4:
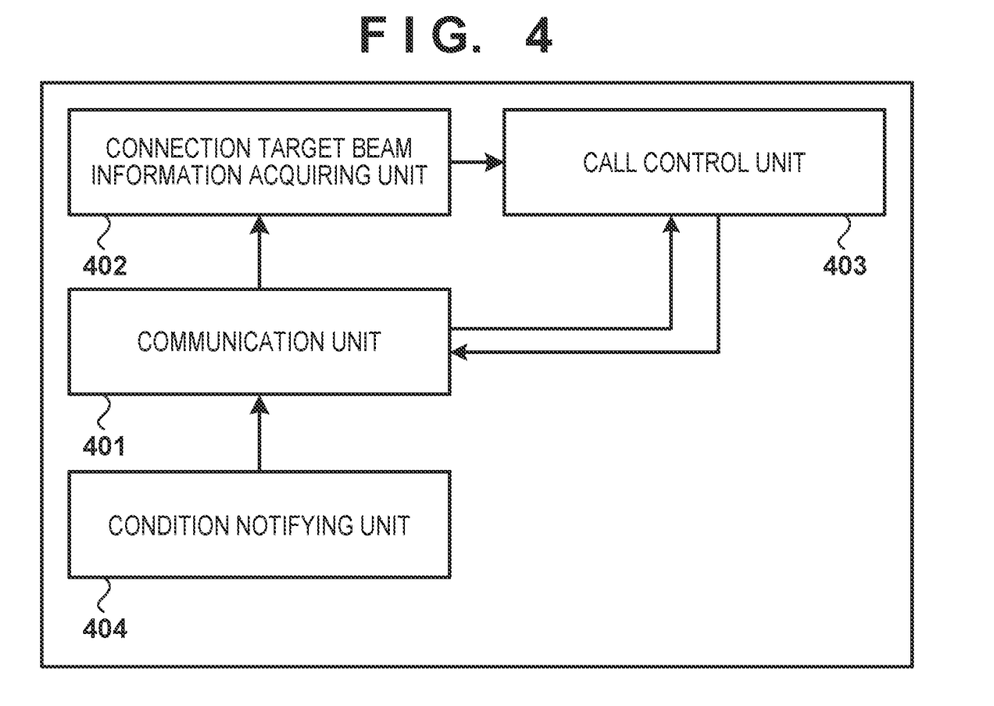
FIG. 4 is a diagram illustrating an example of a functional configuration of the network device.

Next, an example of a functional configuration of the network device will be described with reference to FIG. 4. As described above, the network device is, for example, the node of the core network, the CU or the DU in the base station device, and is not limited to any of these devices. Therefore, the following description is focused on functions for executing functions according to the present embodiment, and a description of functions that are inherent in the respective devices is omitted. The network device includes, for example, a communication unit 401, a connection-target-beam information acquiring unit 402, a call control unit 403, and a condition notifying unit 404.

In the case where the network device is, for example, the DU, the communication unit 401 is capable of forming one or more beams by controlling a non-illustrated antenna, and is configured such that the communication unit 401 can be connected to the terminal device by using at least one of the beams. Note that in the case where the network device is the DU, the communication unit 401 is configured such that it can communicate with the CU, a switch that is located between the CU and the DU, or another DU via the switch, by using the fronthaul line. In the case where the network device is the CU, the communication unit 401 can communicate with a node in the core network or a CU in another base station device by using the backhaul line, and can communicate with a DU under the CU by using the fronthaul line. In the case where the network device is the node of the core network, the communication unit 401 can communicate with the CU in the base station device by using the backhaul line.

The connection-target-beam information acquiring unit 402 acquires the information regarding the connection target beam that is reported by the terminal device. For example, in the case where the network device is the DU, the connection-target-beam information acquiring unit 402 acquires the information regarding the connection target beam as a radio signal directly from the terminal device. In the case where the network device is the CU, the connection-target-beam information acquiring unit 402 acquires the information regarding the connection target beam that is received by the DU from the terminal device and transferred by the DU. In the case where the network device is the node of the core network, the connection-target-beam information acquiring unit 402 acquires the information regarding the connection target beam that is received by the DU from the terminal device, transferred by the DU to the CU, and further transferred by the CU.

The call control unit 403 identifies some beams based on the acquired information regarding the connection target beam, and performs control to call (i.e., perform paging of) the terminal device by using the identified beams. Thus, it is possible to avoid a situation in which the paging message is sent using an unnecessarily large number of beams, and therefore the radio resource utilization efficiency can be improved and the paging message can be kept from interfering with another signal.

In order to perform the control as described above, the call control unit 403 stores and manages information that identifies the terminal device in association with the connection target beam that is reported by the terminal device. In the case where the network device is, for example, the node of the core network, the call control unit 403 manages information regarding terminal devices, of which connection target beams are beams that can be formed by any of all base station devices under control of the node, in association with the respective connection target beams. In the case where the network device is, for example, the CU, the call control unit 403 manages information regarding terminal devices, of which connection target beams are beams that can be formed by DUs under the CU, in association with the respective connection target beams. In the case where the network device is, for example, the DU, the call control unit 403 manages information regarding terminal devices, of which connection target beams are beams that are formed by the DU, in association with the respective connection target beams.

In the case where the network device is, for example, the node of the core network, when calling a terminal device, the call control unit 403 identifies a connection target beam corresponding to the terminal device, and identifies a DU that forms the identified beam. The call control unit 403 then sends a paging message, for which the identified beam is designated, to a CU above the DU. Upon receiving the paging message, the CU transfers the paging message to the DU that forms the designated beam, and causes the DU to send the paging message as a radio signal. In this case, the paging message is not sent to CUs in base station devices that do not send the paging message, and therefore the processing load on the CUs can be reduced and the communication volume in the backhaul line can be reduced.

In the case where the network device is the CU, the node of the core network sends, to all CUs under the node, a paging message that includes information that indicates a terminal device as the destination of the paging message. Upon receiving the paging message from the node of the core network, respective call control units 403 of the CUs determine whether or not the terminal device, which is the destination of the paging message, is under their management. When the terminal device, which is the destination, is managed by a call control unit 403, the call control unit 403 transfers the paging message to the DU that forms the connection target beam corresponding to the terminal device, and causes the DU to send the paging message as a radio signal. In this case, the node of the core network does not perform processing according to the connection target beam, and therefore can perform paging with a reduced processing load. Further, the paging message is not sent to DUs that do not send the paging message, and therefore the processing load on the DUs can be reduced and the communication volume in the fronthaul line can be reduced.

In the case where the network device is the DU, the node of the core network sends, to all CUs under the node, a paging message that includes information that indicates a terminal device as the destination of the paging message. The CUs transfer the paging message to all DUs under the respective CUs. Upon receiving the paging message, respective call control units 403 of the DUs determine whether or not the terminal device, which is the destination of the paging message, is under their management. When the terminal device, which is the destination, is managed by a call control unit 403, the call control unit 403 sends the paging message as a radio signal by using the connection target beam corresponding to the terminal device. In this case, the node of the core network and the CUs do not perform processing according to the connection target beam, and therefore can perform paging with a reduced processing load.

Note that the call control unit 403 can send the paging message by using not only the connection target beam but also a beam that is located within a predetermined range from the connection target beam. For example, when a plurality of groups each including one or more beams are formed in advance, the call control unit 403 may perform control such that the paging message is to be sent by using some or all beams included in a group. The call control unit 403 may define the range of beams by which the paging message is to be sent, according to the condition for reporting the connection target beam (e.g., the number of transitions of the connection target beam/the number of beams to which the connection target beam transitioned/transition of the connection target DU). For example, when the connection target beam is reported every time the connection target beam transitions two times or every time the number of beams to which the connection target beam transitioned reaches three, the call control unit 403 can send the paging message by using the connection target beam and a beam that is adjacent to the connection target beam. When a DU corresponding to the post-transition connection target beam differs from a DU corresponding to the pre-transition connection target beam, the call control unit 403 can send the paging message by using beams that can be formed by the DU corresponding to the post-transition connection target beam.

The condition notifying unit 404 notifies the terminal device of the condition for reporting the information regarding the connection target beam. Note that the condition notifying unit 404 may be omitted when the condition is determined in advance.

Note that some functions may be distributed between, for example, a plurality of network devices. For example, the call control unit 403 can be distributed between the node of the core network or the CU, and the DU, in which case, the node of the core network or the CU can manage, with respect to each terminal device, information regarding a DU that forms the connection target beam of the terminal device, and the DU can manage information regarding the connection target beam corresponding to the terminal device. The node of the core network or the CU can send the paging message to the DU corresponding to the terminal device, and the DU can send the paging message by using one or more beams that include the beam corresponding to the terminal device.

(Flow of Processing)

The following describes the flow of processing that is executed by the terminal device and the network device as described above. First, an example in which the network device is the DU will be described with reference to FIG. 5. Note that for simplification of the description, the following are only described in this example: a DU1 that forms a beam group A, a CU1 above the DU1, a DU2 that forms a beam group B, a CU2 above the DU2, and a node (denoted with "CN" in FIG. 5) of the core network. However, there may be a large number of CUs and a large number of DUs under each of the CUs. Also, there may be, for example, a plurality of nodes for different TACs in the core network.

Figure 5:
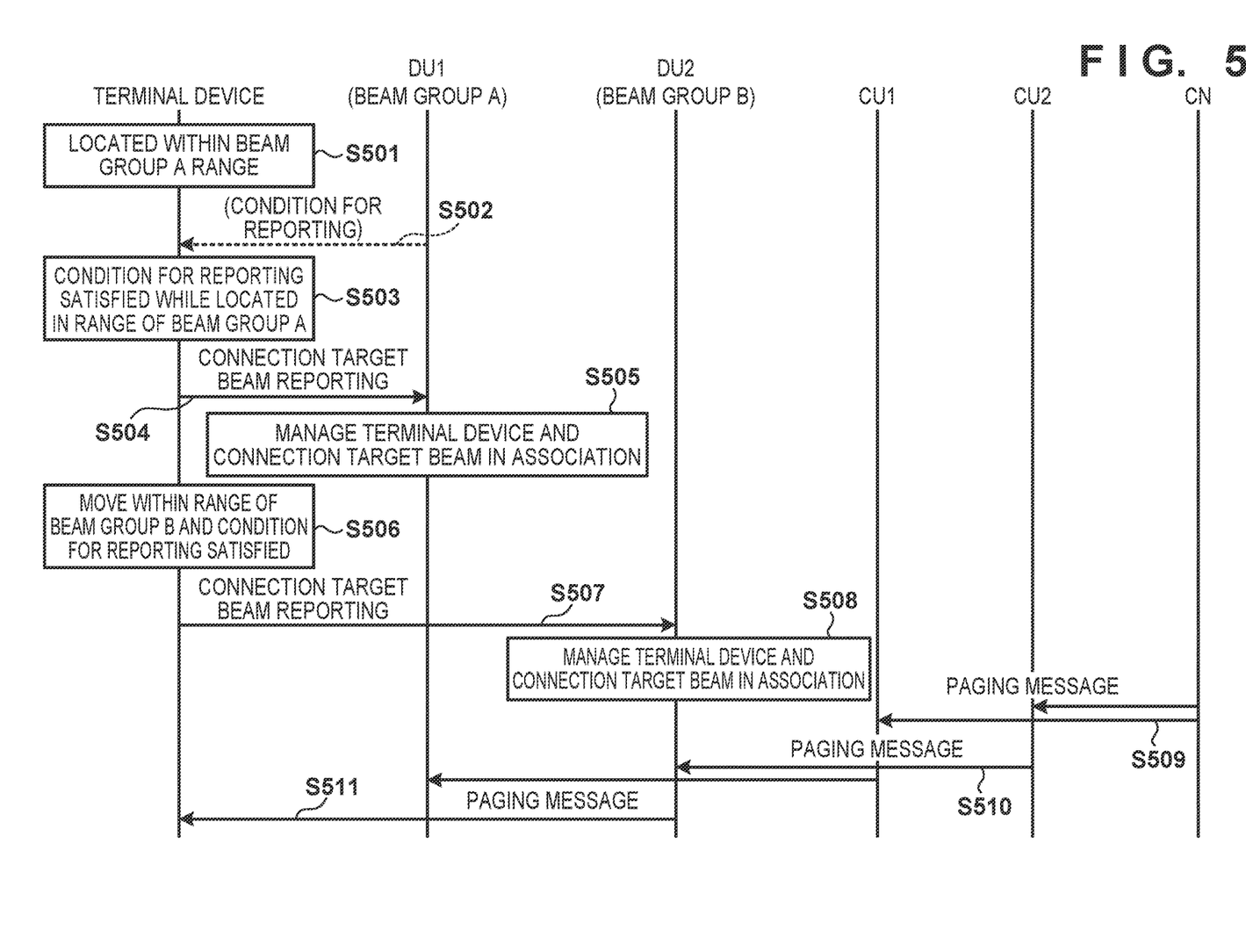
FIG. 5 is a diagram illustrating a first example of the flow of calling processing executed by the radio communication system.

First, it is assumed that the terminal device is located within the range of the beam group A (S501) and the connection target beam of the terminal device is included in the beam group A. At this time, for example, notification of a condition for reporting the connection target beam may be made by the DU1 (S502). It is assumed that, while the terminal device, which is in the unconnected state, is located within the range of the beam group A, the condition for reporting the connection target beam is then satisfied as a result of, for example, the number of transitions of the connection target beam reaching a predetermined number of times (S503). The terminal device then notifies the DU1 of information regarding the connection target beam at that point in time (S504). The DU1 stores and manages the reported connection target beam in association with information that identifies the terminal device (S505).

It is assumed that the terminal device thereafter moves to the range of the beam group B while being in the unconnected state and a condition for reporting the connection target beam is satisfied (S506). For example, in a case where the condition for reporting the connection target beam is that the DU that provides the connection target beam differs between before and after a transition of the connection target beam, the condition is satisfied when the terminal device moves to the range of the beam group B. Under the above circumstances, the terminal device reports information regarding the connection target beam to the DU2 (S507). The DU2 then stores and manages the reported connection target beam in association with the information that identifies the terminal device (S508).

At this time, notification for updating information that associates the connection target beam and the terminal device may be transmitted between the DU2 and the DU1. For example, the DU2 can notify the DU1 of updated information (via the CU2 and the CU1, for example). Note that the DU1 may determine that the terminal device is no longer located within the range of the beam group A when, for example, the DU1 does not receive a report of the connection target beam for a predetermined period of time. Thus, the DU1 can recognize that the terminal device is no longer located within the range of the beam group A formed by the DU1, and can be kept from sending a paging message unnecessarily.

It is assumed that paging of the terminal device then takes place. Under the above circumstances, the node of the core network first sends a paging message to the CU1 and the CU2 that are CUs of base station devices that belong to a TAC managed by the node (S509). Then, the CU1 and the CU2 transfer the paging message to the DU1 and the DU2, respectively (S510). Since the terminal device is located within the range of the beam group B formed by the DU2, the DU2 sends the paging message as a radio signal (S511). In contrast, the DU1 does not send the paging message since the terminal device is not located within the range of the beam group A.

Next, an example in which the network device is the CU will be described with reference to FIG. 6. First, it is assumed that the terminal device is located within the range of the beam group A (S601) and the connection target beam of the terminal device is included in the beam group A. At this time, notification of a condition for reporting the connection target beam may be made by, for example, the CU1 via the DU1 (S602). It is assumed that, while the terminal device, which is in the unconnected state, is located within the range of the beam group A, the condition for reporting the connection target beam is then satisfied (S603). The terminal device then notifies the DU1 of information regarding the connection target beam at that point in time, and the DU1 transfers the information to the CU1 (S604). The CU1 stores and manages the reported connection target beam in association with information that identifies the terminal device (S605).

It is assumed that the terminal device thereafter moves to the range of the beam group B while being in the unconnected state and a condition for reporting the connection target beam is satisfied (S606). Under the above circumstances, the terminal device reports information regarding the connection target beam to the DU2, and the DU2 transfers the information to the CU2 (S607). The CU2 stores and manages the reported connection target beam in association with the information that identifies the terminal device (S608).

At this time, notification for updating information that associates the connection target beam and the terminal device may be transmitted between the CU2 and the CU1. For example, the CU2 can notify the CU1 of updated information (via the core network, for example). Note that the CU1 may determine that the terminal device is no longer located within the range of the beam group A when, for example, the CU1 does not receive a report of the connection target beam for a predetermined period of time. Thus, the CU1 can recognize that the terminal device is no longer located within the range of the beam group A formed by the DU1 under the CU1, and can be kept from sending a paging message unnecessarily.

It is assumed that paging of the terminal device then takes place. Under the above circumstances, the node of the core network first sends a paging message to the CU1 and the CU2 that are CUs of base station devices that belong to the TAC managed by the node (S609). Since the terminal device is located within the range of the beam group B formed by the DU2 under the CU2, the CU2 transfers the paging message to the DU2 (S610). In contrast, the CU1 does not transfer the paging message to the DU1 under the CU1 since the terminal device is not located within the range of the beam group A formed by the DU1. Thereafter, the DU2 sends the transferred paging message as a radio signal (S611). In contrast, the DU1, which did not receive the paging message, does not send the paging message.

Figure 6:
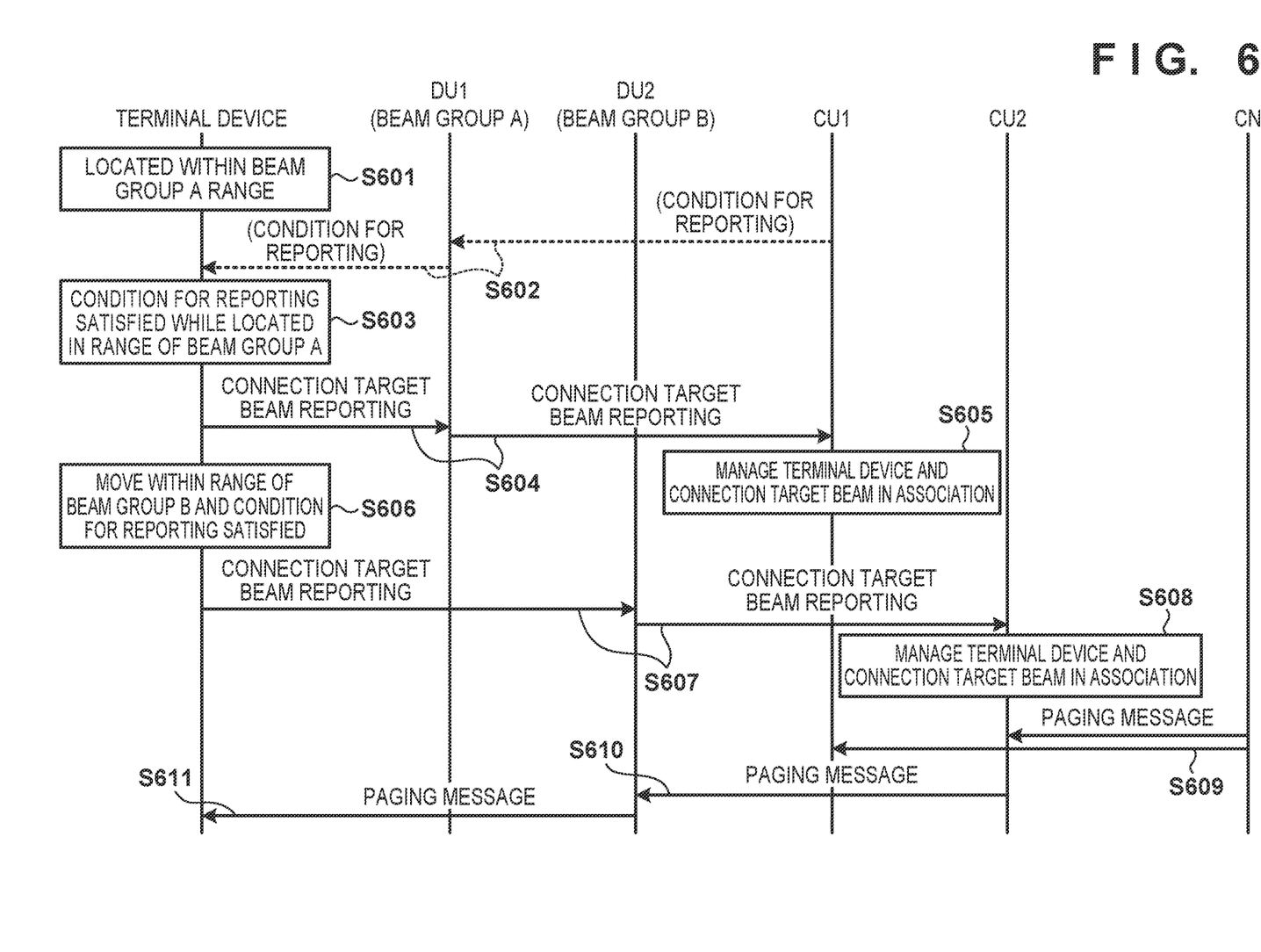
FIG. 6 is a diagram illustrating a second example of the flow of the calling processing executed by the radio communication system.

Although the example of FIG. 6 shows a case where only the CU manages the terminal device in association with the corresponding connection target beam, control may be distributed between the CU and the DU. For example, the CU may store the terminal device in association with information regarding the DU that provides the connection target beam, and the DU may store the terminal device in association with the connection target beam. For example, the CU1 manages the terminal device in association with the DU1 in step S605, and the DU1 manages the terminal device in association with the connection target beam. Also, the CU2 manages the terminal device in association with the DU2 in step S608, and the DU2 manages the terminal device in association with the connection target beam. As a result, for example, upon receiving the paging message, the CU1 and the CU2 can properly perform control as to whether or not to transfer the paging message to respective DUs under the CU1 and the CU2. Further, the CU1 and the CU2 need not manage the connection target beam, and therefore the amount of information managed by the CU1 and the CU2 can be reduced. Also, the CU1 and the CU2 are only required to receive the information regarding the terminal device from the DUs, and therefore the amount of information transmitted via the fronthaul line can be reduced. Also, the DU can properly limit the beam to be used for sending the paging message, and therefore unnecessary transmission of the paging message can be reduced.

Next, an example in which the network device is the node of the core network will be described with reference to FIG. 7. First, it is assumed that the terminal device is located within the range of the beam group A (S701) and the connection target beam of the terminal device is included in the beam group A. At this time, notification of a condition for reporting the connection target beam may be made by, for example, the node of the core network via the CU1 and the DU1 (S702). It is assumed that, while the terminal device, which is in the unconnected state, is located within the range of the beam group A, the condition for reporting the connection target beam is then satisfied (S703). The terminal device then notifies the DU1 of information regarding the connection target beam at that point in time, the DU1 transfers the information to the CU1, and the CU1 further transfers the information to the node of the core network (S704). The node of the core network stores and manages the reported connection target beam in association with information that identifies the terminal device (S705).

It is assumed that the terminal device thereafter moves to the range of the beam group B while being in the unconnected state and a condition for reporting the connection target beam is satisfied (S706). Under the above circumstances, the terminal device reports information regarding the connection target beam to the DU2, the DU2 transfers the information to the CU2, and the CU2 transfers the information to the node of the core network (S707). The node of the core network stores and manages the reported connection target beam in association with the information that identifies the terminal device (S708).

It is assumed that paging of the terminal device then takes place. Under the above circumstances, the terminal device is located within the range of the beam group B formed by the DU2, and therefore the node of the core network sends a paging message to the CU2 above the DU2 (S709). In contrast, the node of the core network does not send the paging message to the CU1 since the terminal device is not located within the range of the beam group that is formed by the DU under the CU1. The CU2 then transfers the received paging message to the DU2 under the CU2 (S710). Thereafter, the DU2 sends the transferred paging message as a radio signal (S711). In contrast, the paging message is not sent from the DU1 since the CU1 and the DU1 do not receive the paging message.

Figure 7:
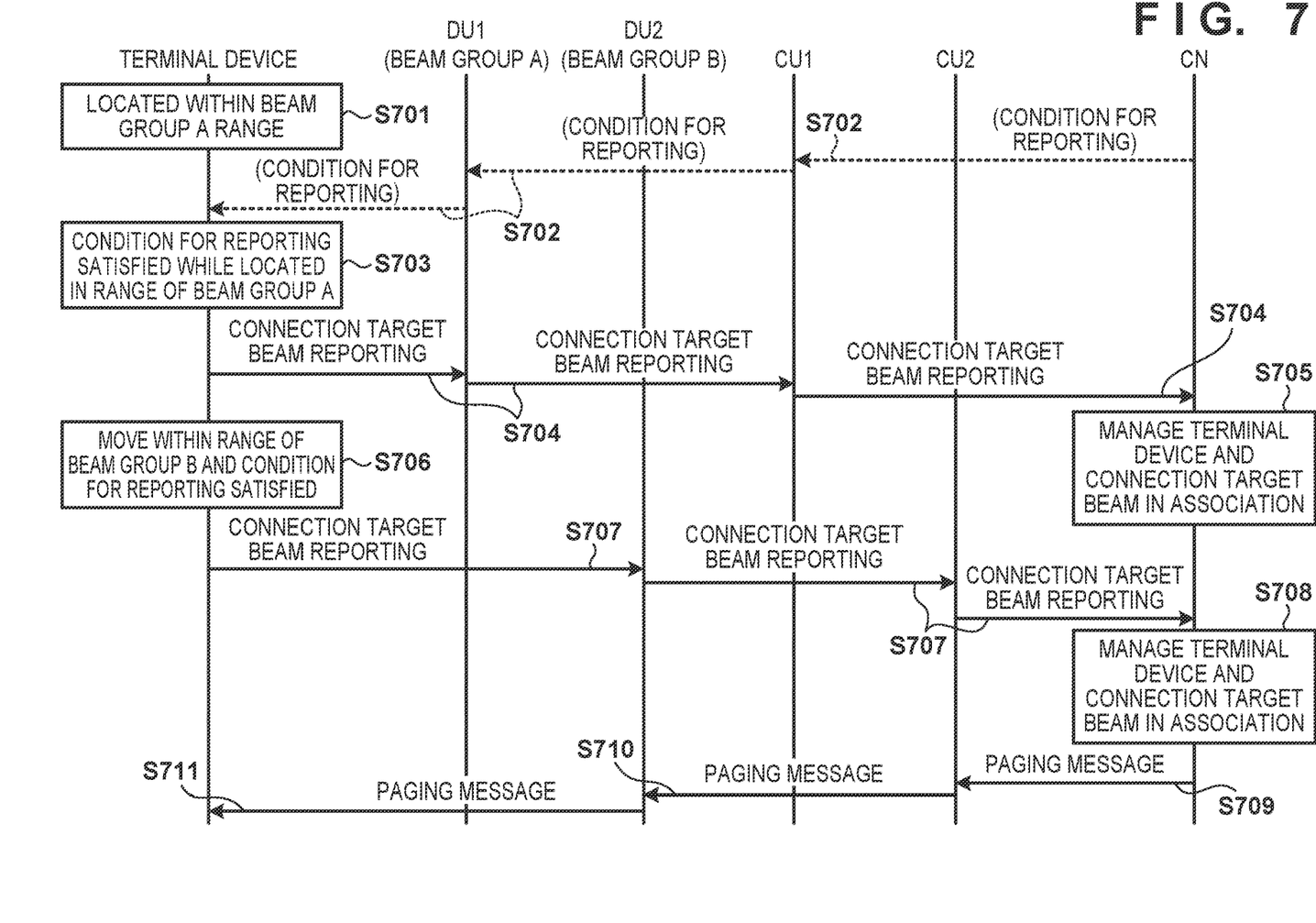
FIG. 7 is a diagram illustrating a third example of the flow of the calling processing executed by the radio communication system.

Although the example of FIG. 7 shows a case where only the node of the core network manages the terminal device in association with the corresponding connection target beam, control may be distributed between the node of the core network and the CU or the DU. For example, the node of the core network may store the terminal device in association with information regarding the DU that provides the connection target beam or information regarding the CU above the DU, and the CU or the DU may store the terminal device in association with the connection target beam. For example, the node of the core network manages the terminal device in association with the DU1 (or CU1) in step S705, and the DU1 (or CU1) manages the terminal device in association with the connection target beam. Also, the node of the core network manages the terminal device in association with the DU2 (or CU2) in step S708, and the DU2 (or CU2) manages the terminal device in association with the connection target beam. As a result, for example, the node of the core network can properly limit the destination of the paging message to a CU. Further, the node of the core network need not manage the connection target beam, and therefore the amount of information managed by the node of the core network can be reduced. Also, the node of the core network is only required to receive the information regarding the terminal device from the DU (or CU), and therefore the amount of information to be transmitted can be reduced. Also, the DU (or CU) can properly limit the beam to be used for sending the paging message, and therefore unnecessary transmission of the paging message can be reduced.

As described above, according to the present embodiment, the terminal device, which is in the unconnected state, monitors a connection target beam that is to be used when establishing a connection with the base station device, and notifies the network device of information regarding the connection target beam. Based on the notification, the network device performs paging of the terminal device by using some available beams. As a result, it is possible to avoid a situation in which the paging message is sent by using an unnecessarily large number of beams, and therefore the radio resource utilization efficiency can be improved and interference with another signal can be reduced.

The present invention is not limited to the above embodiments and various changes and modifications can be made within the spirit and scope of the present invention. Therefore, to apprise the public of the scope of the present invention, the following claims are made.

What is claimed is:

1. A terminal device that can be connected to one or more base station devices that each form one or more beams, the terminal device comprising:
   at least one processor; and at least one memory storing instructions that, when executed by the at least one processor, cause the at least one processor to function as:
  a monitoring unit for monitoring, in a state, between a connected date and an idle state, in which a resource radio control (RRC) is not established but the terminal device can send a certain signal to any one of the one or more base station devices, a connection target beam to be used when the terminal device establishes a connection with the any of the one or more base station devices;
  a reporting unit for reporting information regarding the connection target beam to the any one of the one or more base station devices that forms the connection target beam in response to determining that:
    the connection target beam has transitioned from one of the one or more beams to another beam of the one or more beams;
    a condition received from at least one of the one or more base station devices is satisfied; and
    a number of transitions of the connection target beam in the state reaches a first predetermined value being more than one and a number of beams to which the connection target beam has transitioned in the state reaches a second predetermined value being more than one; and
  a receiving unit for receiving, from the at least one of the one or more base station devices, the condition under which the reporting unit reports the information regarding the connection target beam,
  wherein which base station device among the one or more base station devices is to execute paging of the terminal device and which a subset of beams that includes the connection target beam from among the one or more beams is to be used in the paging are controlled based on the information regarding the connection target beam, wherein a number of the subset of beams is less than a number of the one or more beams,
  and
  wherein the condition includes that the terminal device is in the state.

2. The terminal device according to claim 1,
wherein the reporting unit reports the information regarding the connection target beam without transitioning to the connected state.

3. The terminal device according to claim 1,
wherein each of the one or more base station devices includes one or more devices each capable of forming the one or more beams by controlling a physical layer, and
the reporting unit reports the information regarding the connection target beam when one device of the one or more devices that forms the connection target beam before the connection target beam has transitioned differs from another device of the one or more devices that forms the connection target beam after the connection target beam has transitioned.

4. A network device in a network that includes one or more base station devices that each form one or more beams, the network device comprising:
  at least one processor;
  at least one memory storing instructions that, when executed by the at least one processor, cause the at least one processor to function as:
  a receiving unit for receiving, from a terminal device that can be connected to the one or more base station devices and that is in a state, between a connected state and an idle state, in which a resource radio control (RRC) connection is not established but the terminal device can send a certain signal to any one of the one or more base station devices; a report regarding a connection target beam to be used when the terminal device establishes a connection with the any one of the one or more base station devices, wherein the report is generated by the terminal device and transmitted by the terminal device to the network device in response to determining, by the terminal device, that:
    the connection target beam has transitioned from one of the one or more beams to another beam of the one or more beams;
    a condition received from the network device is satisfied; and
    a number of transitions of the connection target beam in the state reaches a first predetermined value being more than one and a number of beams to which the connection target beam has transitioned in the state reaches a second predetermined value being more than one;
  a control unit, based on the information regarding the connection target beam received from the terminal device, for determining the network device to execute paging of the terminal device and determining a subset of beams that includes the connection target beam from among the one or more beams that are formed by the one or more base station devices, the subset of beams is to be used in the paging, and a number of the subset of beams is less than a number of the one or more beams; and
  a notifying unit for notifying the terminal device of the condition for making the report regarding the connection target beam,
  wherein the condition includes that the terminal device is in the state.

5. The network device according to claim 4,
wherein the network device is a node of a core network, the node being connected to each of the one or more base station devices.

6. The network device according to claim 4,
wherein, out of a first device and a second device that are included in each of the one or more base station devices, the network device is the second device, the first device controlling layers that are lower than a radio resource control (RRC) layer and that include a physical layer, and the second device controlling layers that are higher than the layers controlled by the first device and that include the RRC layer.

7. The network device according to claim 4,
wherein, out of a first device and a second device that are included in each of the one or more base station devices, the network device is the first device, the first device controlling layers that are lower than a radio resource control (RRC) layer and that include a physical layer, and the second device controlling layers that are higher than the layers controlled by the first device and that include the RRC layer.

8. A method for controlling a terminal device that can be connected to one or more base station devices that each form one or more beams, the method comprising:
  monitoring, in a state, between a connected state and an idle state, in which a resource radio control (RRC) connection is not established but the terminal device can send a certain signal to any one of the one or more base station devices; a connection target beam to be used when the terminal device establishes a connection with the any one of the one or more base station devices;

reporting information regarding the connection target beam to the any one of the one or more base station devices that forms the connection target beam in response to determining that:
  the connection target beam has transitioned from one of the one or more beams to another beam of the one or more beams;
  a condition received from at least one of the one or more base station devices is satisfied; and
  a number of transitions of the connection target beam in the state reaches a first predetermined value being more than one and a number of beams to which the connection target beam has transitioned in the state reaches a second predetermined value being more than one; and receiving, from the at least one of the one or more base station devices the condition under which the reporting unit reports the information regarding the connection target beam, wherein which base station device among the one or more base station devices is to execute paging of the terminal device and which a subset of beams that includes the connection target from among the one or more beams is to be used in the paging are controlled based on the information regarding the connection target beam, wherein a number of the subset of beams is less than a number of the one or more beams, and wherein the condition includes that the terminal device is in the state.

9. A method for controlling a network device in a network that includes one or more base station devices that each form one or more beams, the method comprising:
  receiving, from a terminal device that can be connected to the one or more base station devices and that is in a state, between a connected state and an idle state, in which a resource radio control (RRC) connection is not established but the terminal device can send a certain signal to any one of the one or more base station devices, a report regarding a connection target beam to be used when the terminal device establishes a connection with the any one of the one or more base station devices, wherein the report is generated by the terminal device and transmitted by the terminal device to the network device in response to determining, by the terminal device, that
  the connection target beam has transitioned from one of the one or more beams to another beam of the one or more beams;
  a condition received from the network device is satisfied; and
  a number of transitions of the connection target beam in the state reaches a first predetermined value being more than one and a number of beams to which the connection target beam has transitioned in the state reaches a second predetermined value being more than one;
  performing, based on the information regarding the connection target beam received from the terminal device, for determining the network device to execute paging of the terminal device and determining a subset of beams that include the connection target beam from among the one or more beams that are formed by the one or more base station devices, the subset of beams is to be used in the paging, and a number of the subset of beams is less than a number of the one or more beams; and notifying the terminal device of the condition for making the report regarding the connection target beam, wherein the condition includes that the terminal device is in the state.

10. A non-transitory computer readable storage medium storing a program that causes a computer, which is included in a terminal device that can be connected to one or more base station devices that each form one or more beams, to:
  monitor, in a state, between a connected state and an idle state, in which a resource radio control (RRC) is not established but the terminal device can send a certain signal to any one of the one or more base station devices, a connection target beam to be used when the terminal device establishes a connection with the any one of the one or more base station devices;
  report, at least based on a fact that the connection target beam has transitioned, information regarding the connection target beam to the any one of the one or more base station devices that forms the connection target beam in response to determining that:
    the connection target beam has transitioned from one of the one or more beams to another beam of the one or more beams;
    a condition received from at least one of the one or more base station devices is satisfied; and
    a number of transitions of the connection target beam in the state reaches a first predetermined value being more than one and a number of beams to which the connection target beam has transitioned in the state reaches a second predetermined value being more than one; and
  receive, from the at least one of the one or more base station devices, the condition under which the reporting unit reports the information regarding the connection target beam, wherein which base station device among the one or more base station devices is to execute paging of the terminal device and which a subset of beams that includes the connection target beam from among the one or more beams is to be used in the paging are controlled based on the information regarding the connection target beam, wherein a number of the subset of beams is less than a number of the one or more beams, wherein the condition includes that the terminal device is in the state.

11. A non-transitory computer readable storage medium storing a program that causes a computer, which is included in a network device in a network that includes one or more base station devices that each form one or more beams, to:
  receive, from a terminal device that can be connected to the one or more base station devices and that is in a state, between a connected state and an idle state, in which a resource radio control (RRC) connection is not established but the terminal device can send a certain signal to any one of the one or more base station devices, a report regarding a connection target beam to be used when the terminal device establishes a connection with the any one of the one or more base station devices, wherein the report is generated by the terminal device and transmitted by the terminal device to the network device in response to determining, by the terminal device, that:

the connection target beam has transitioned from one of the one or more beams to another beam of the one or more beams;

a condition received from the network device is satisfied; and a number of transitions of the connection target beam in the state reaches a first predetermined value being more than one and a number of beams to which the connection target beam has transitioned in the state reaches a second predetermined value being more than one;

perform, based on the information regarding the connection target beam received from the terminal device, for determining the network device to execute paging of the terminal device and determining a subset of beams that include the connection target beam from among the one or more beams that are formed by the one or more base station devices, the subset of beams is to be used in the paging, and a number of the subset of beams is less than a number of the one or more beams; and notify the terminal device of the condition for making the report regarding the connection target beam, wherein the condition includes that the terminal device is in the state.

* * * * *